US012724626B2

(12) United States Patent
Agrawal et al.

(10) Patent No.: US 12,724,626 B2
(45) **Date of Patent: *Sep. 1, 2026**

(54) ADAPTATION OF DIFFERENT PORTIONS OF AN ADAPTIVE DISPLAY DEVICE IN A WEARABLE CONFIGURATION

(71) Applicant: MOTOROLA MOBILITY LLC, Wilmington, DE (US)

(72) Inventors: Amit Kumar Agrawal, Bangalore (IN); Bill Ryan, Libertyville, IL (US); Benicio Pereira Goulart, Campinas (BR); Mark D Finney, Chicago, IL (US); Bernardo Augusto Godinho De Oliveira, Campinas (BR); James Sloss, Chicago, IL (US); Carlos Padilha, Porto Alegre/RS (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,317

(22) Filed: Oct. 17, 2023

(65) Prior Publication Data

US 2025/0123858 A1 Apr. 17, 2025

(51) Int. Cl.

| | |
|---|---|
| ***G06F 1/16*** | (2006.01) |
| ***G06F 3/04886*** | (2022.01) |
| ***G06F 9/451*** | (2018.01) |
| ***G06T 7/70*** | (2017.01) |
| ***H04M 1/02*** | (2006.01) |
| ***H04M 1/72427*** | (2021.01) |

(52) U.S. Cl.
CPC .............. *G06F 9/451* (2018.02); *G06F 1/163* (2013.01); *G06F 1/1652* (2013.01); *G06F 3/04886* (2013.01); *G06T 7/70* (2017.01); *H04M 1/0216* (2013.01); *H04M 1/72427* (2021.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 2016/0048296 | A1* | 2/2016 | Gan | G06F 3/147 715/745 |
| 2016/0327987 | A1* | 11/2016 | Huitema | G04G 17/045 |
| 2017/0085688 | A1* | 3/2017 | Zhou | H04B 5/77 |
| 2017/0110088 | A1* | 4/2017 | Dickinson | A41D 1/14 |
| 2017/0352058 | A1* | 12/2017 | Bender | G06Q 50/01 |
| 2019/0369569 | A1* | 12/2019 | Olsen | G06T 7/0002 |
| 2022/0030326 | A1* | 1/2022 | Tandon | H04N 21/431 |

* cited by examiner

*Primary Examiner* — Christopher J Fibbi
(74) *Attorney, Agent, or Firm* — Isidore PLLC

(57) ABSTRACT

An electronic device enables techniques for user style adaptation of different portions of an adaptive display device in a wearable configuration. The device includes a flexible electronic display, that is mounted in a flexible enclosure that enables the display to be bent into a configuration for use as a wearable device. The device further includes a processor communicatively coupled to the electronic display, and which identifies a context associated with a user of the electronic device, while the electronic device is being worn by the user. Based on the context, the electronic device loads and presents a customization display theme on at least an outward facing portion of the display.

19 Claims, 13 Drawing Sheets

ADAPTATION OF DIFFERENT PORTIONS OF AN ADAPTIVE DISPLAY DEVICE IN A WEARABLE CONFIGURATION

BACKGROUND

1. Technical Field

The present disclosure generally relates to portable electronic devices, and more specifically to portable electronic devices that support customization.

2. Description of the Related Art

Modern smartphones and tablet computers are equipped with high-resolution displays, as well as integrated digital cameras that capture high quality still pictures and videos. In addition to the camera and video features, smartphones can provide myriad other features. The features can include communication features, such as sending text messages and making voice calls. Additionally, the features can include engaging in social networking activities, internet browsing, navigation and mapping, online shopping, health and fitness, gaming, and more. As modern smartphones are useful for much more than voice calls, people often take their smartphones with them everywhere they go. Accordingly, a smartphone can also serve as an accessory for users in a wide variety of settings and activities. Accessories play a significant role in the world of fashion and personal style. They are more than just decorative additions to an outfit, and can serve various important purposes that contribute to an individual's overall look and self-expression.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
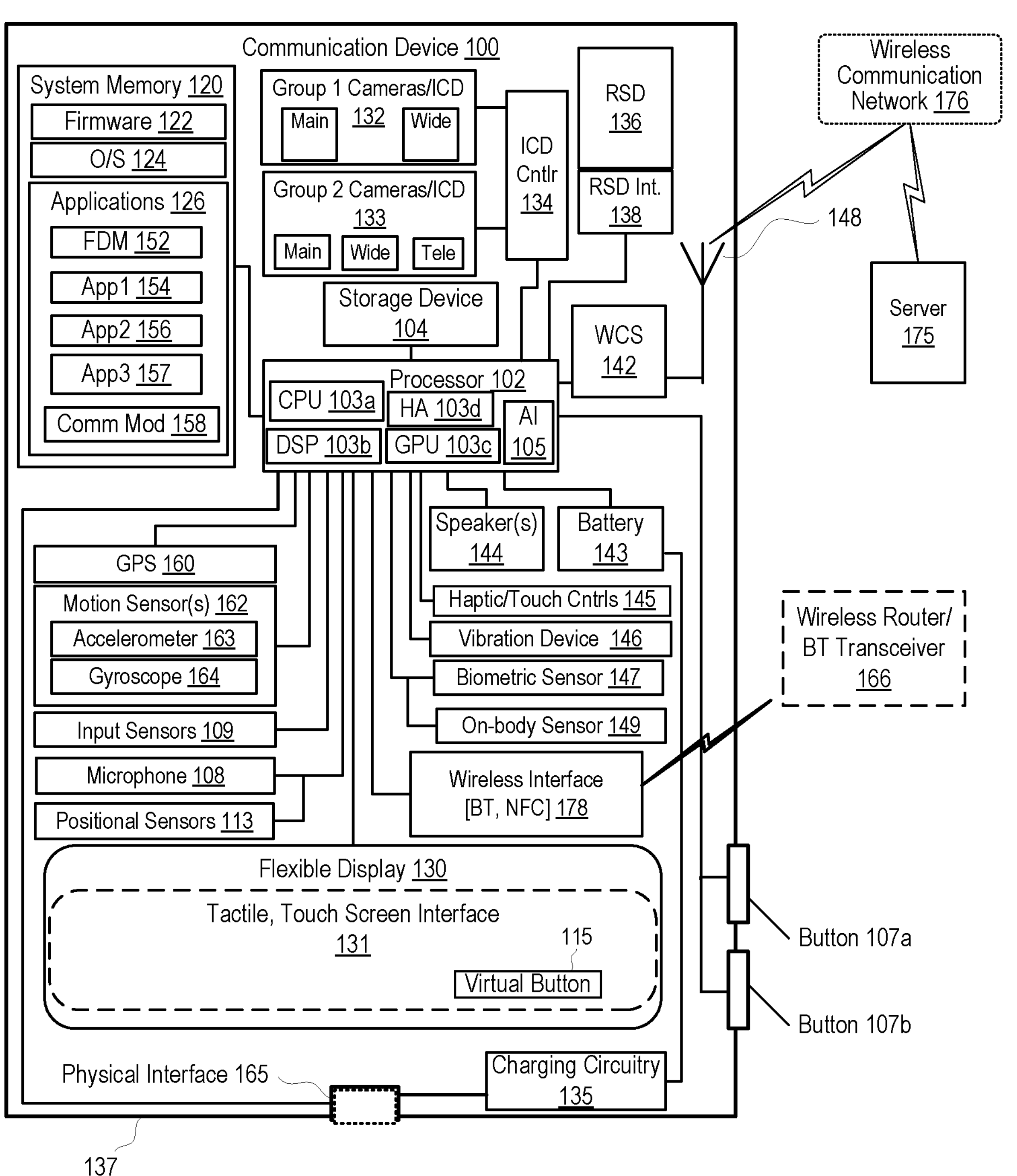
FIG. 1 depicts an example component makeup of a communication device with specific components used to enable the device to perform functions for user style adaptation of different portions of an adaptive display device, according to one or more embodiments.

According to aspects of the present disclosure, an electronic device, a method, and a computer program product provides techniques for adaptation of different portions of an adaptive display device in a wearable configuration. The device includes a flexible electronic display that is mounted in a flexible enclosure, which enables the display to be bent into a configuration for use as a wearable device. The device further includes a processor communicatively coupled to the electronic display and which identifies a context associated with a user of the electronic device, while the electronic device is being worn by the user. Based on the context, the electronic device loads and presents a customization display theme on at least an outward facing portion of the display, while informational content is displayed on another portion of the display.

Flexible display technology can enable displays that can be bent, curved, rolled, or otherwise flexed without losing their functionality. Flexible displays are made possible through the use of special materials and manufacturing techniques, and they have a wide range of potential applications in various industries. In one or more embodiments, the flexible displays are comprised of materials that can bend or stretch without breaking. In one or more embodiments, materials for the flexible display can include organic light-emitting diodes (OLEDs). Organic light-emitting diode displays can be used in disclosed embodiments, and provide the advantage of not requiring a separate backlight, allowing them to be made thinner and more flexible compared to traditional LCD displays. One or more embodiments may utilize Active-Matrix Organic Light-Emitting Diode (AMOLED) displays, which are a type of OLED display with an active-matrix control scheme, enabling improved resolution and response time compared to passive matrix OLEDs.

Flexible display technology enables features of the disclosed embodiments that are not possible on a traditional 'candy bar' style of smartphone. The ability for electronic devices to have displays that can fold or curve provides different visible regions or sections along the display, where one viewer can observe one display region/section while another observer can observe a different display region/section of the same electronic device. The present disclosure takes advantage of this curved or foldable quality of the flexible display to create logical display regions that separate the regions/sections into different displays for presenting different content. As one aspect of the disclosure, the multiple logical display regions enable the disclosed embodiments to provide informational content in one logical display region, while providing non-informational content in another logical display region. While the display is in the folded or curved configuration, each logical display region is at a different viewing angle with respect to each other.

The informational content can include presentation of data such as a date, time of day, weather information, stock tickers, video playback, conference calls, health and fitness information, and so on. The non-informational content can include designs, images (including images derived from generative artificial intelligence (AI)), and so on. In one or more embodiments, the non-informational content is selected based on an environment surrounding the electronic device, such as colors of walls, objects in the area, and so on. In one or more embodiments, the non-informational content is selected based on apparel being worn by the user. According to one aspect, electronic devices in accordance with disclosed embodiments can be worn on the wrist of a user to present a curved outer display that wraps at least partially around the wrist, creating a first display region that is predominantly visible to the wearer, and another display region that is predominantly visible to other people in proximity to the wearer. The processor segregates the two different display regions into separate logical display regions, each receiving respective inputs from a graphics processing unit (GPU) rendering the content being displayed. In one or more of the disclosed embodiments, the logical display region that is predominantly visible to other people in proximity to the wearer displays non-informational content which can include a design and/or image that is associated with apparel of the wearer. The apparel of the wearer can be detected by one or more image capturing devices (cameras) integrated within the electronic device. Colors and/or patterns of the apparel can be used to determine non-informational content to display. Another logical display region can render informational content, such as a time of day, weather information, received notifications, and so on. Thus, the disclosed embodiments provide adaptive non-informational content in one logical display region of an electronic device at a first viewing angle, and contemporaneously provide informational content in another logical display region of the electronic device at a second viewing angle. Accordingly, disclosed embodiments can combine device functionality with a fashion accessory that adapts to environmental conditions such as surroundings and apparel and/or other factors such as location, calendar events (e.g., birthdays), local or national holidays, and so on.

One or more embodiments can include an electronic device including: a flexible electronic display, where the flexible electronic display is mounted in a flexible enclosure that enables the display to be bent into a configuration for use as a wearable device; and a processor communicatively coupled to the electronic display, and which: identifies a context associated with a user of the electronic device, while the electronic device is being worn by the user; and based on the context, loads and presents a customization display theme on at least an outward facing portion of the display. In one or more embodiments, the electronic device can further include at least one image capturing device communicatively coupled to the processor and which captures images within a field of view and produces image content. The processor: triggers the at least one image capturing device to activate and capture corresponding preview image(s) of a respective field of view; receives the preview image(s); determines an on-body position of the electronic device, in part based on the preview images; partitions the electronic display into a first display region facing away from the user and at least one second display region; determines the user context from information within the received preview image(s); and loads the customization display theme with one or more theme elements rendered on at least the first display region. In one or more embodiments, the electronic device can further include at least one sensor for detecting an on-body or near-body position of the electronic device, the at least one sensor communicatively coupled to the processor. The processor triggers the at least one image capturing device to activate and capture corresponding preview image(s) in response to receiving an indication of an on-body or near-body position of the electronic device.

In one or more embodiments, the processor enables the electronic device to output non-informational content associated with the user context in the first display region and output informational content in the second display region. In one or more embodiments, to determine the user context, the processor identifies apparel being worn by the user. To present the customization display theme, the processor renders an image corresponding to the identified apparel in the first display region on the electronic display. In one or more embodiments, the processor identifies one or more of a color and a pattern within the apparel worn by the user, and the processor renders, via a generative artificial intelligence (AI) process, a background image in at least one of the first display region and the second display region that includes at least one of a similar color to a color of the identified apparel and a similar pattern to a pattern of the identified apparel. In one or more embodiments, the processor receives, via one or more sensors, biometric information of the user, and the processor determines the user context based, in part, on the biometric information. In one or more embodiments, the electronic device can further include: an audio capturing device communicatively coupled to the processor, and determining the user context is then further based on received audio content from the audio capturing device.

In one or more embodiments, the electronic device can further include: a communication interface that enables the electronic device to connect to and transmit instructions to a second electronic device. To determine a user context from information within the received preview image(s), the processor transmits the received preview image(s) to the second electronic device to cause/trigger the second electronic device to provide the customization display theme to the electronic device. The second electronic device, which can be a customization server, in one embodiment, is preprogrammed to respond to a communication of the preview images from the first electronic device with a request for context identification and corresponding image retrieval to complete the customization request.

One or more embodiments can further include a method including: identifying, by a processor of an electronic device having a flexible electronic display and usable as a wearable device, a context associated with a user of the electronic device, while the electronic device is being worn by the user; and based on the context, loading and presenting a customization display theme on at least an outward facing portion of a flexible display of the electronic device. One or more embodiments can further include a computer program product including a non-transitory computer readable medium having program instructions that when executed by a processor of an electronic device that comprises a flexible electronic display that is usable as a wearable device, the program instructions configure the electronic device to perform functions including: identifying a context associated with a user of the electronic device, while the electronic device is being worn by the user; and based on the context, loading and presenting a customization display theme on at least an outward facing portion of the display.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Electronic device 100 includes specific components that enable the device to: identifies a context associated with a user of the electronic device, while the electronic device is being worn by the user; and based on the context, loads and presents a customization display theme on at least an outward facing portion of the display. Examples of electronic device 100 include, but are not limited to, mobile devices, a notebook computer, a mobile phone, a smart phone, a digital camera with enhanced processing capabilities, a smart watch, a tablet computer, and other types of electronic device. It is appreciated that electronic device 100 can include other types of electronic devices that are capable of providing user style adaptation of different portions of an adaptive display device in a wearable configuration.

Electronic device 100 includes processor 102 (typically as a part of a processor integrated circuit (IC) chip), which includes processor resources such as central processing unit (CPU) 103*a*, communication signal processing resources such as digital signal processor (DSP) 103*b*, graphics processing unit (GPU) 103*c*, and hardware acceleration (HA) unit 103*d*. In some embodiments, the hardware acceleration (HA) unit 103*d* may establish direct memory access (DMA) sessions to route network traffic to various elements within electronic device 100 without direct involvement from processor 102 and/or operating system 124. Processor 102 can interchangeably be referred to as controller 102.

Controller 102 can, in some embodiments, include image signal processors (ISPs) (not shown) and dedicated artificial intelligence (AI) engines 105. Controller 102 is communicatively coupled to storage device 104, system memory 120, input devices (introduced below), output devices, including integrated flexible display 130, and image capture device (ICD) controller 134. Flexible display 130 is capable of being bent and/or folded to enable a display that can support multiple logical display regions, and where each logical display region has a different viewing angle with respect to other logical display regions on flexible display 130.

According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera. ICD controller 134 can perform these functions in response to commands received from processor 102 in order to control ICDs 132, 133 to capture video or still images of a local scene within a FOV of the operating/active ICD. Throughout the disclosure, the term image capturing device (ICD) is utilized interchangeably to be synonymous with and/or refer to any one of the cameras 132, 133. Both sets of cameras 132, 133 include image sensors that can capture images that are within the field of view (FOV) of the respective camera 132, 133.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103*c* and certain aspects of device communication via wireless networks are performed by DSP 103*b*, with support from CPU 103*a*. However, for simplicity in describing the features of the disclosure, the functionality provided by one or more of CPU 103*a*, DSP 103*b*, GPU 103*c*, and ICD controller 134 are collectively described as being performed by processor 102. Collectively, components integrated within processor 102 support computing, classifying, processing, transmitting and receiving of data and information, and presenting of graphical images within a display.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, flexible display module (FDM) 152, other applications, indicated as 154, 156 and 157, and communication module 158. Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing the different modules. For example, flexible display module 152 includes program instructions for facilitating user style adaptation of different portions of an adaptive display device in a wearable configuration.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device encoded with program code and corresponding data, and RSD 136 can be interchangeably referred to as a non-transitory computer program product. RSD 136 may have a version of one or more of the applications (e.g., 152, 154, 156, 158) and specifically flexible display module 152 stored thereon. Processor 102 can access RSD 136 to provision electronic device 100 with program code that, when executed/processed by processor 102, the program code causes or configures processor 102 and/or generally electronic device 100, to provide the various user style adaptation functions described herein.

Electronic device 100 includes an integrated display 130, which incorporates a tactile, touch screen interface 131 that can receive user tactile/touch input. As a touch screen device, integrated display 130 allows a user to provide input to or to control electronic device 100 by touching features within the user interface presented on flexible display 130. Tactile, touch screen interface 131 can be utilized as an input device. The touch screen interface 131 can include one or more virtual buttons, indicated generally as 115. In one or more embodiments, when a user applies a finger on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface. In one or more embodiments, the flexible display 130 can include materials that can bend or stretch without breaking. These materials can include, but are not limited to, organic light-emitting diodes (OLEDs). Organic light-emitting diode displays can be used in disclosed embodiments. One or more embodiments may utilize Active-Matrix Organic Light-Emitting Diode (AMOLED) displays, which are a type of OLED display with an active-matrix control scheme, enabling improved resolution and response time compared to passive matrix OLEDs. The electronic device 100 may further include a flexible and deformable enclosure, that enables the electronic device 100 to be shaped into a variety of positions for use on a flat surface such as a table, or worn as a wearable electronic device.

Electronic device 100 can further include microphone 108, one or more output devices such as speakers 144, and one or more input buttons, indicated as 107*a* and 107*b*.

While two buttons are shown in FIG. 1, other embodiments may have more or fewer input buttons. Microphone 108 can also be referred to as an audio input device. In some embodiments, microphone 108 may be used for identifying a user via voiceprint, voice recognition, and/or other suitable techniques. Input buttons 107*a* and 107*b* may provide controls for volume, power, and ICDs 132, 133. Additionally, electronic device 100 can include input sensors 109 (e.g., sensors enabling gesture detection by a user). Furthermore, electronic device 100 can include one or more positional sensors 113 that are coupled to one or more linkage members to enable the processor 102 to determine a mode or configuration of the electronic device in terms of how the flexible display 130 is bent or shaped by a user.

Electronic device 100 further includes haptic touch controls 145, vibration device 146, fingerprint/biometric sensor 147, global positioning system (GPS) device 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera) for user detection/identification. Electronic device 100 can further include on-body sensor 149, which may include a capacitive sensor, electrodermal sensor, or other suitable sensor type to determine when the electronic device 100 being used as a wearable device.

GPS device 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/protects the components internal to electronic device 100.

Electronic device 100 also includes a physical interface 165. Physical interface 165 of electronic device 100 can serve as a data port and can be coupled to charging circuitry 135 and device battery 143 to enable recharging of device battery 143.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 176 and with other devices, such as server 175 and other connected devices, via one or more of data, audio, text, and video communications. Communication module 158 can support various communication sessions by electronic device 100, such as audio communication sessions, video communication sessions, text communication sessions, exchange of data, and/or a combined audio/text/video/data communication session. In one or more embodiments, server 175 is configured to receive preview image(s) of the field of view of the ICDs 132, 133 of electronic device 100, and to perform analysis and/or computations to provide images corresponding to a customization display theme to the electronic device 100.

WCS 142 and antennas 148 allow electronic device 100 to communicate wirelessly with wireless communication network 176 via transmissions of communication signals to and from network communication devices, such as base stations or cellular nodes, of wireless communication network 176. Wireless communication network 176 further allows electronic device 100 to wirelessly communicate with server 175 and other communication devices, which can be similarly connected to wireless communication network 176. In one or more embodiments, various functions that are being performed on communications device 100 can be supported using or completed via/on server 175.

Electronic device 100 can also wirelessly communicate, via wireless interface(s) 178, with wireless communication network 176 via communication signals transmitted by short range communication device(s) to and from an external WiFi router (or wireless transceiver device) 180, which is communicatively connected to wireless communication network 176. Wireless interface(s) 178 can be a short-range wireless communication component providing Bluetooth, near field communication (NFC), and/or wireless fidelity (Wi-Fi) connections. In one embodiment, electronic device 100 can receive Internet or Wi-Fi based calls, text messages, multimedia messages, and other notifications via wireless interface(s) 178. In one or more embodiments, electronic device 100 can communicate wirelessly with external wireless device 166, such as a WiFi router or BT transceiver, via wireless interface(s) 178. In an embodiment, WCS 142 with antenna(s) 148 and wireless interface(s) 178 collectively provide wireless communication interface(s) of electronic device 100. The device 100 of FIG. 1 is only a specific example of devices that can be used with embodiments of the present invention. Devices that utilize aspects of the disclosed embodiments can include, but are not limited to, a smartphone, a tablet computer, a laptop computer, a desktop computer, a wearable computer, and/or other suitable electronic device.

Figure 2A:
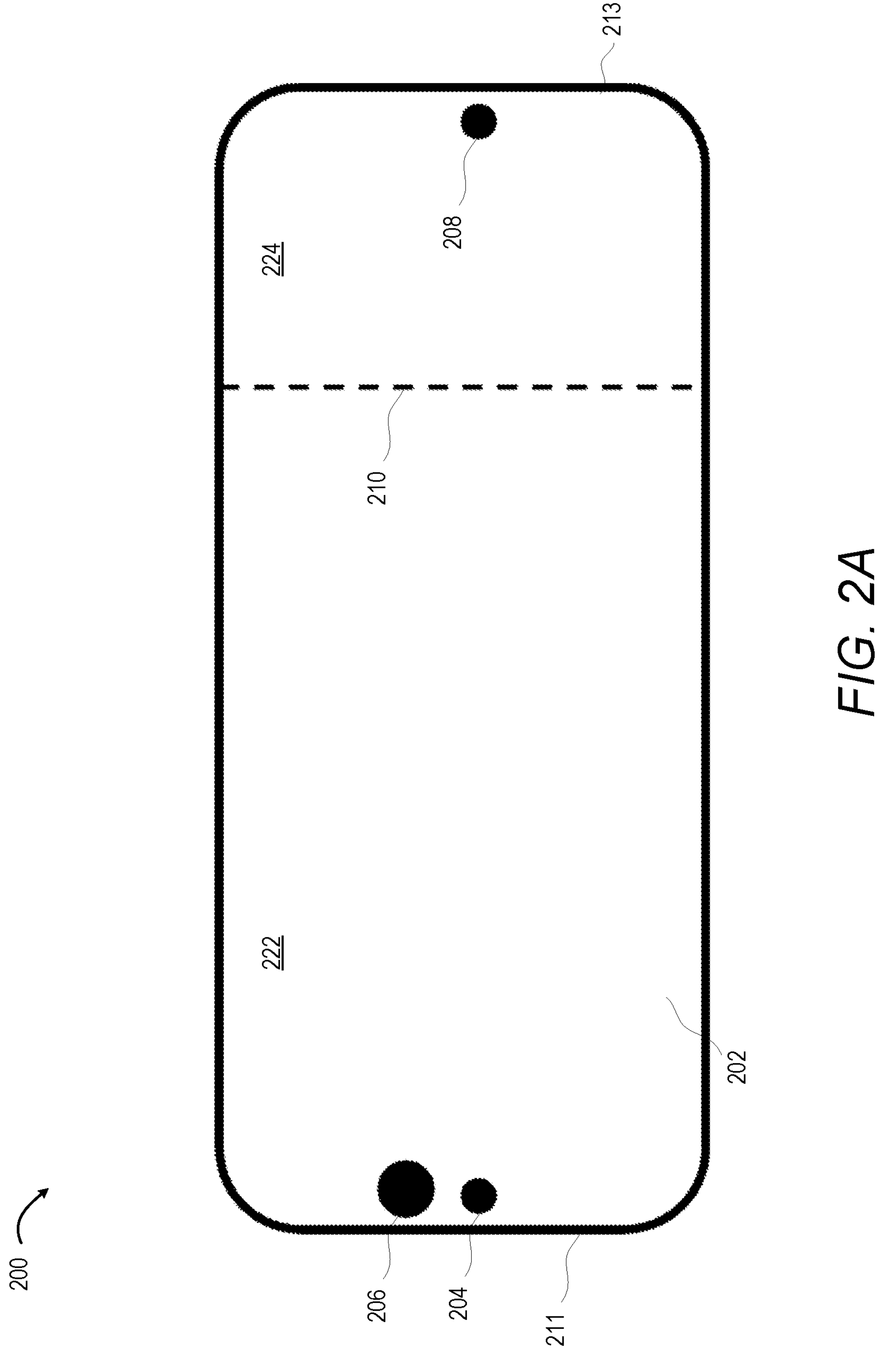
FIG. 2A illustrates an example display of an electronic device that has been logically partitioned to provide two asymmetrical logical display regions, according to one or more embodiments.

FIG. 2A illustrates an example display of an electronic device 200 that has been logically partitioned to provide two asymmetrical logical display regions, according to one or more embodiments. Device 200 can be an implementation of electronic device 100, having similar components and/or functionality. Device 200 includes flexible display 202 which is capable of being folded, including being folded along line 210, which fold location is identified by the processor and utilized to separate display 202 into logical display region 222 and logical display region 224. Note that line 210 is a virtual line that indicates where the separation of regions 222 and 224 occurs, but line 210 may not necessarily be rendered or visible on display 202. As can be seen in FIG. 2A, logical display region 222 is larger than logical display region 224. Thus, FIG. 2A depicts asymmetrical logical display regions. In one or more embodiments, logical display region 222 can be utilized to render non-informational content, while logical display region 224 renders informational content. Alternatively, in one or more embodiments, logical display region 222 is utilized to render informational content, while logical display region 224 renders non-informational content.

Device 200 may include one or more image capturing devices, indicated at 204, 206, and 208. While three image capturing devices are shown on device 200, other embodiments may include more or fewer image capturing devices. Furthermore, while device 200 includes two image capturing devices (204 and 206) near first end 211 and one image capturing device 208 near second end 213, other embodiments may include a different arrangement of image capturing devices. With the integrated image capturing devices, one or more embodiments of the disclosure can include capturing preview images (by the image capturing devices 204, 206, 208) and transmitting received preview image(s) to a second electronic device to cause the second electronic device to provide the customization display theme to the electronic device; and receiving images corresponding to the customization display theme from the second electronic device.

Figure 2B:
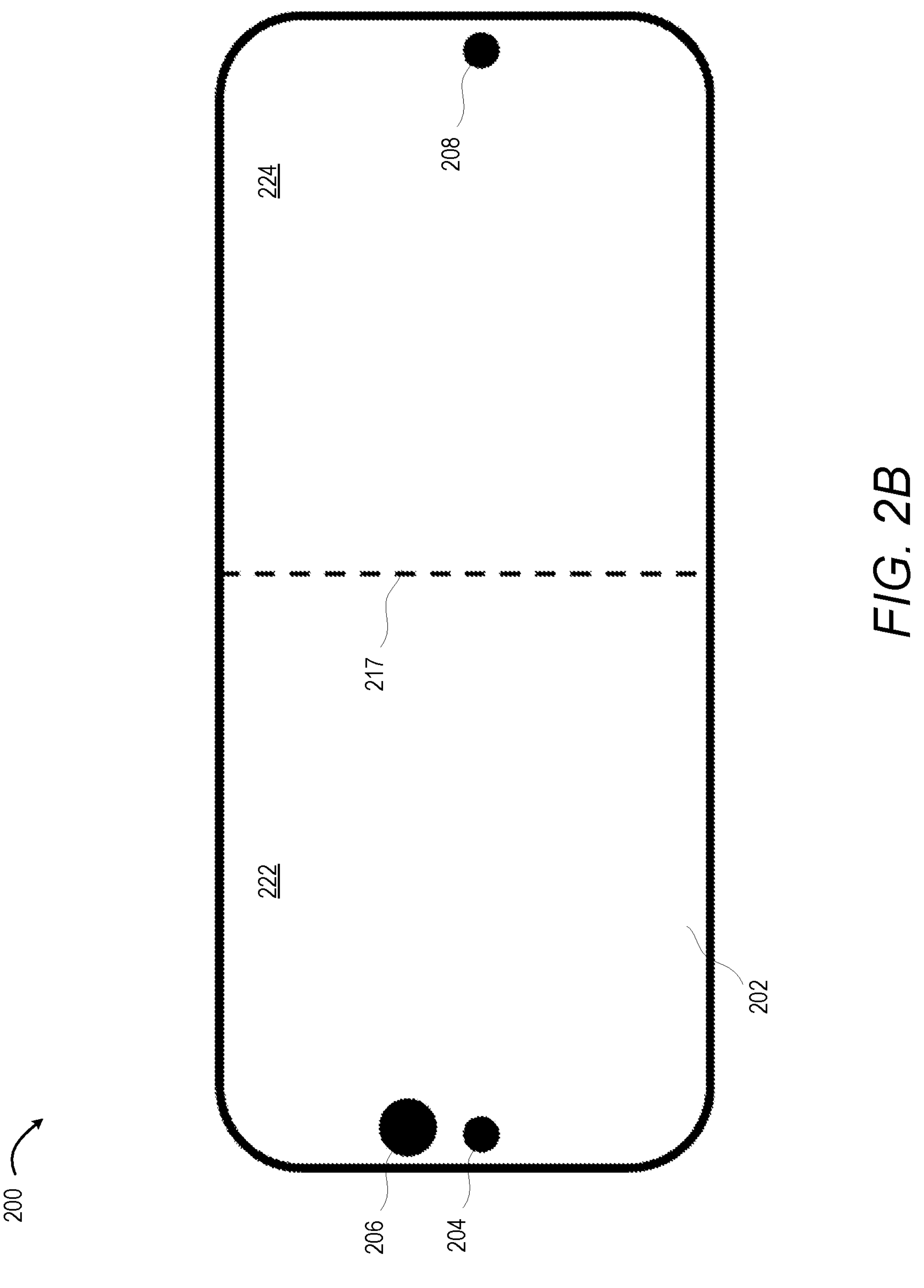
FIG. 2B illustrates an example display of an electronic device that has been logically partitioned to provide two symmetrical logical display regions, according to one or more embodiments.

FIG. 2B illustrates an example display of an electronic device 200 that has been logically partitioned to provide two symmetrical logical display regions, according to one or more embodiments. Device 200 includes flexible display 202 which is capable of being folded, including being folded along line 217. In response to detecting the fold(s), the processor of electronic device 200 can create logical display region 222 and logical display region 224. As can be seen in FIG. 2B, logical display region 222 is substantially the same size as logical display region 224. Thus, FIG. 2B depicts symmetrical logical display regions. In one or more embodiments, logical display region 222 can render non-informational content, while logical display region 224 renders informational content. Alternatively, in one or more embodiments, logical display region 222 renders informational content, while logical display region 224 renders non-informational content.

Figure 2C:
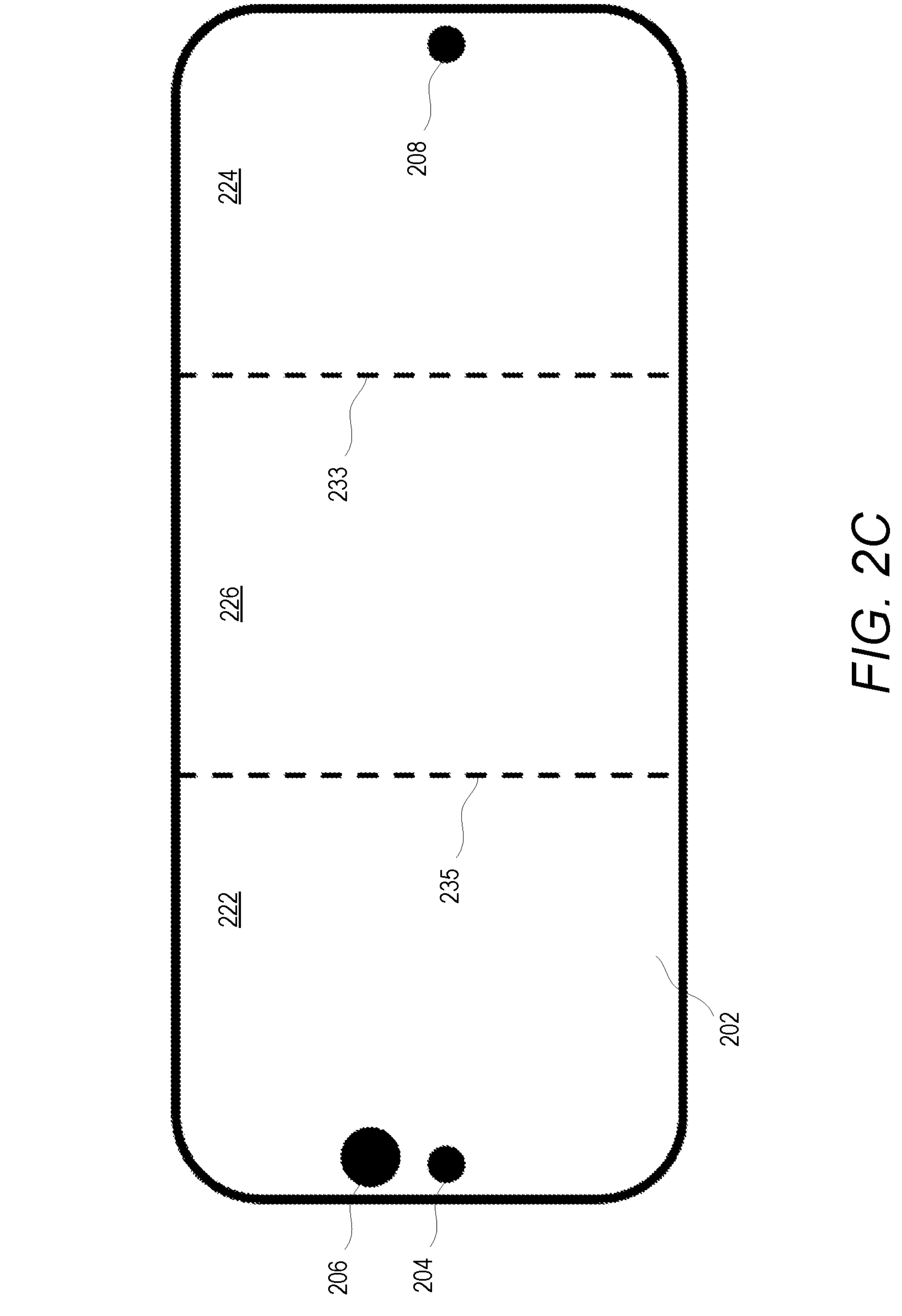
FIG. 2C shows an example display of an electronic device configured to include three logical display regions, according to one or more embodiments.

FIG. 2C shows electronic device 200 configured to include three logical display regions, according to one or more embodiments. Device 200 includes flexible display 202 which is capable of being folded, including being folded along line 233 and also folded along line 235. In response to detecting the fold(s), the processor of electronic device 200 can create logical display region 222, logical display region 224, and logical display region 226. In one or more embodiments, logical display region 222 and logical display region 224 render non-informational content, while logical display region 226 renders informational content. Other combinations of displaying informational and/or non-informational content within the logical display regions 222, 224, and 226, are possible in various disclosed embodiments. Throughout this disclosure, the term 'fold' can include a gradual 'bend' (e.g., curving of the display predominantly along a single axis) and/or a more pronounced angle of a fold that creates a crease along a specific line or axis of the display).

Figure 3:
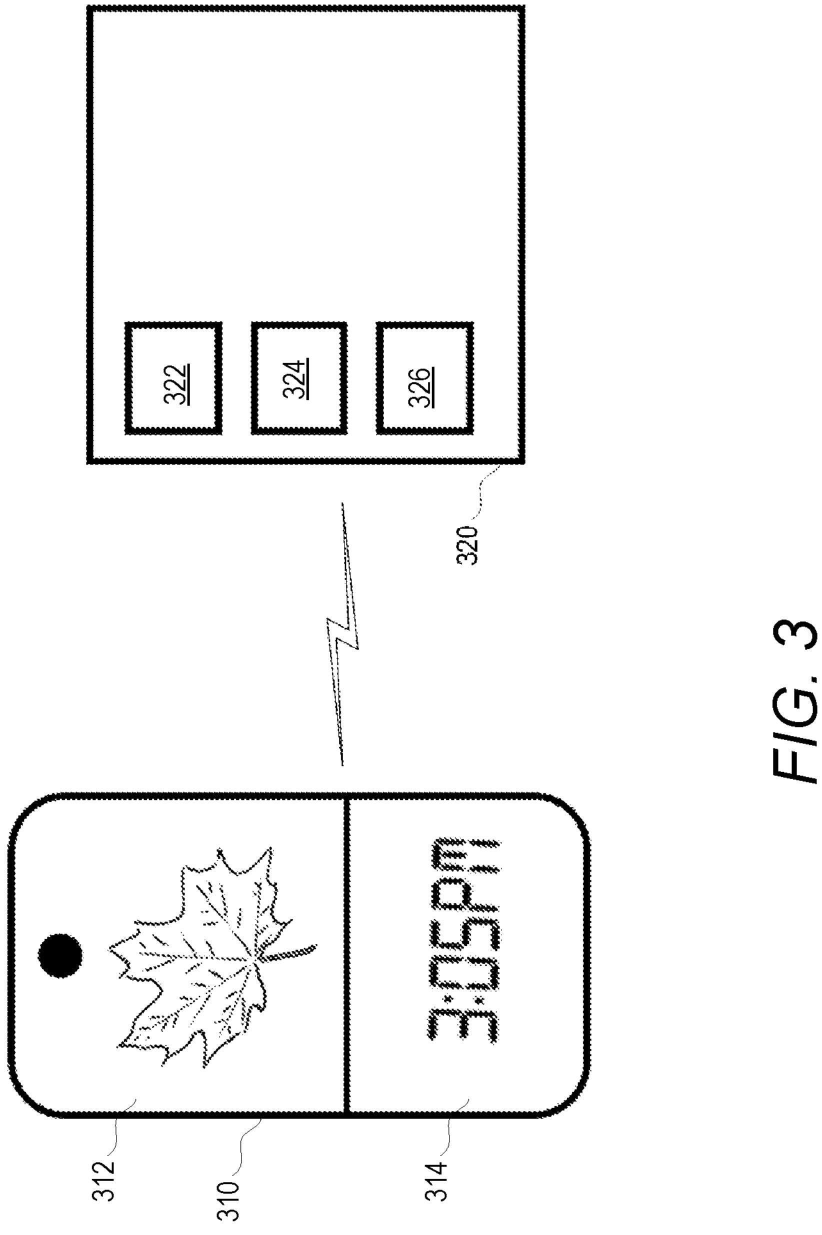
FIG. 3 illustrates a system that includes a device having a flexible electronic device and communicatively coupled to an auxiliary computing device, according to one or more embodiments.

FIG. 3 shows a system 300 that includes a flexible electronic device 310 communicatively coupled to an auxiliary computing device 320, according to one or more embodiments. In one or more embodiments, to enable a foldable and/or wearable form factor of an electronic device that is also deformable, some of the components such as depicted in FIG. 1 may be housed in auxiliary computing device 320. As shown in FIG. 3, flexible electronic device 310 includes a first display region 312 that presents non-informational content, such as a design, and a second display region 314 that displays informational content, such as a time of day. Auxiliary computing device 320 can include a processor 322 that is communicatively coupled to a memory 324 and a communication interface 326. The memory 324 can include a non-transitory computer readable medium that includes instructions executed by processor 322 to perform various functions of one or more embodiments. The communication interface 326 can include a wired and/or wireless communication interface. Accordingly, in one or more embodiments, some computing processes for the electronic device 310 are performed by the auxiliary computing device 320, which communicates with electronic device 310 via communication interface 326. In one or more embodiments, the communication between electronic device 310 and auxiliary computing device 320 is performed via Bluetooth, Bluetooth Low Energy (BLE), and/or other suitable wireless technology. Locating some functionality in the auxiliary computing device 320 allows electronic device 310 to remain light, bendable, and highly configurable, without a loss of processing power. In one or more embodiments, the auxiliary computing device 320 provides some of the processing power for system 300, while the flexible electronic device 310 serves as a content presentation device, wearable device, and/or user interface for the system 300.

In combination, the auxiliary computing device 320 and the flexible electronic device 310 can perform the functions of a conventional electronic device, such as a smartphone. Moreover, the system 300 can work to perform the equivalent functions of any number of other devices as well, including tablet computers, gaming devices, multimedia players, and so on. In one or more embodiments, the auxiliary computing device 320 can be configured as a "puck" or box that can be conveniently carried in a pocket, purse, backpack, and the like. In one or more embodiments, the auxiliary computing device 320 includes a device housing but has no primary display. In these embodiments, the flexible electronic device 310 functions as the primary display for the system 300. Accordingly, disclosed embodiments that utilize an auxiliary computing device enable flexible electronic device 310 to be lighter, enabling more comfort when flexible electronic device 310 is being used as a wearable computing device.

Figure 4:
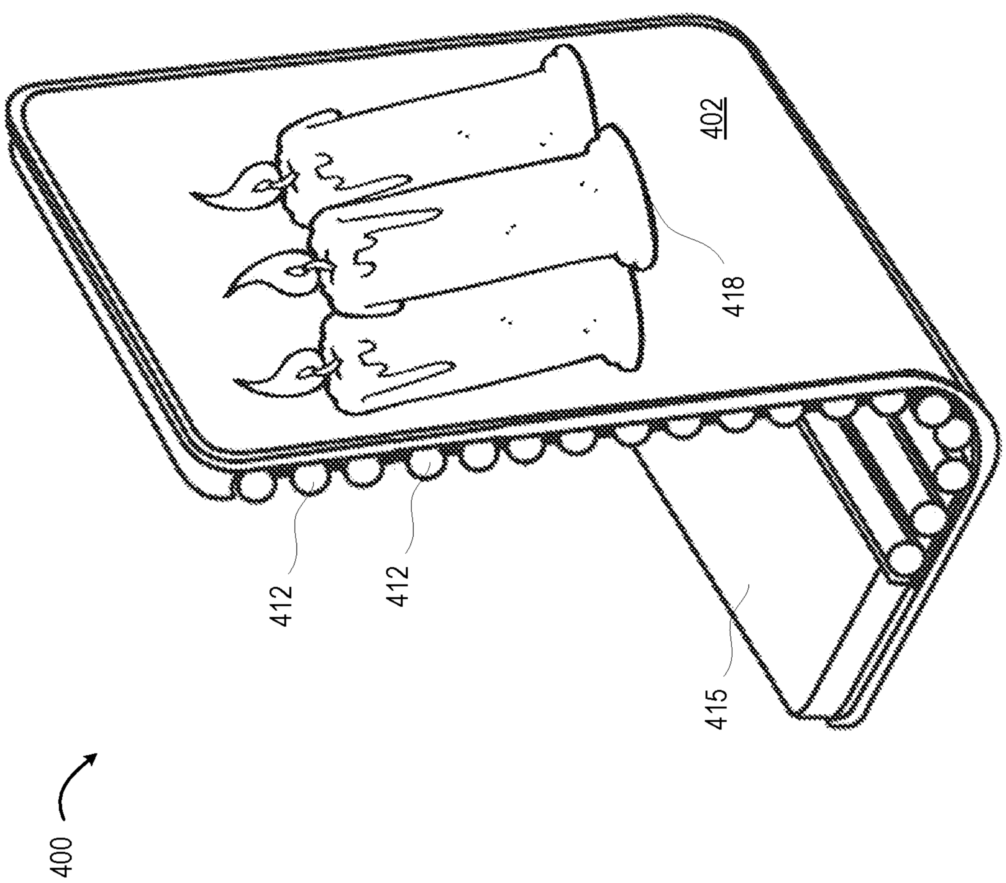
FIG. 4 illustrates a flexible, deformable, electronic device in a stand configuration, rendering a décor image, according to one or more embodiments.

FIG. 4 shows a flexible, deformable, electronic device 400 in a stand configuration, rendering a décor image, according to one or more embodiments. Electronic device 400 can be an implementation of electronic device 100, having similar components and/or functionality. Electronic device 400 includes a deformable housing 415 that includes one or more linkage members, shown generally at 412, that allows the electronic device 400 to be deformable. Accordingly, the electronic device 400 can be bent into a configuration and remains in that configuration until a user changes the configuration by additional bending/unbending. The electronic device 400 includes a flexible electronic display mounted in a flexible enclosure that enables the display 402 to be bent into a configuration for use as a wearable device and/or for use in a surface display configuration. The bent configurations visually separate the display into a first display region and a second display region (logical display regions). In one or more embodiments, integrated positional sensors (e.g., positional sensors 113 of FIG. 1) coupled to the linkage members enable the processor of the electronic device 400 to determine a mode or configuration of the electronic device 400, in terms of the current shape of the display. Thus, in one or more embodiments, the processor can detect when the electronic device is straight, folded, curved, etc.

When flexible electronic device 400 is placed in the stand configuration as shown in FIG. 4, a horizontal or bent lower section of display of the flexible electronic device 400 can be placed on a substantially flat surface such as a desk, table, counter, or the like. In one or more embodiments, the remaining exposed section of the display 402 renders non-informational and/or informational content. As shown in FIG. 4, the display 402 is rendering non-informational content. In particular, the device 400 is shown rendering an image 418 of candles. In one or more embodiments, the image 418 can be a still image such as a digital photograph, illustration, AI-generated image, and so on. In one or more embodiments, the display 402 can render a series of images, such as an animated GIF, and/or a looping video clip. In the example using candles, the animated GIF and/or looping video clip can give the appearance of flickering candles.

In one or more embodiments, a processor within device 400, contributes to the rendering of image 418 and/or the selection process for determining which image is to be rendered on display 402. The selection process can include performing an assessment of an environment surrounding the electronic device 400. The assessment can include acquiring environmental information including, but not limited to, one or more images via onboard cameras (e.g., 132 and 133 of FIG. 1), ambient sounds via onboard microphone (e.g., 108 of FIG. 1), a geographical location via an onboard GPS (e.g., 160 of FIG. 1), and so on. In one or more embodiments, the acquired information is input into an AI engine, and the AI engine generates an output that includes a generative image that is displayed on display 402. Accordingly, in disclosed embodiments, device 400 can serve as a décor element in a room, when configured in a stand configuration as shown in FIG. 4.

Figure 5:
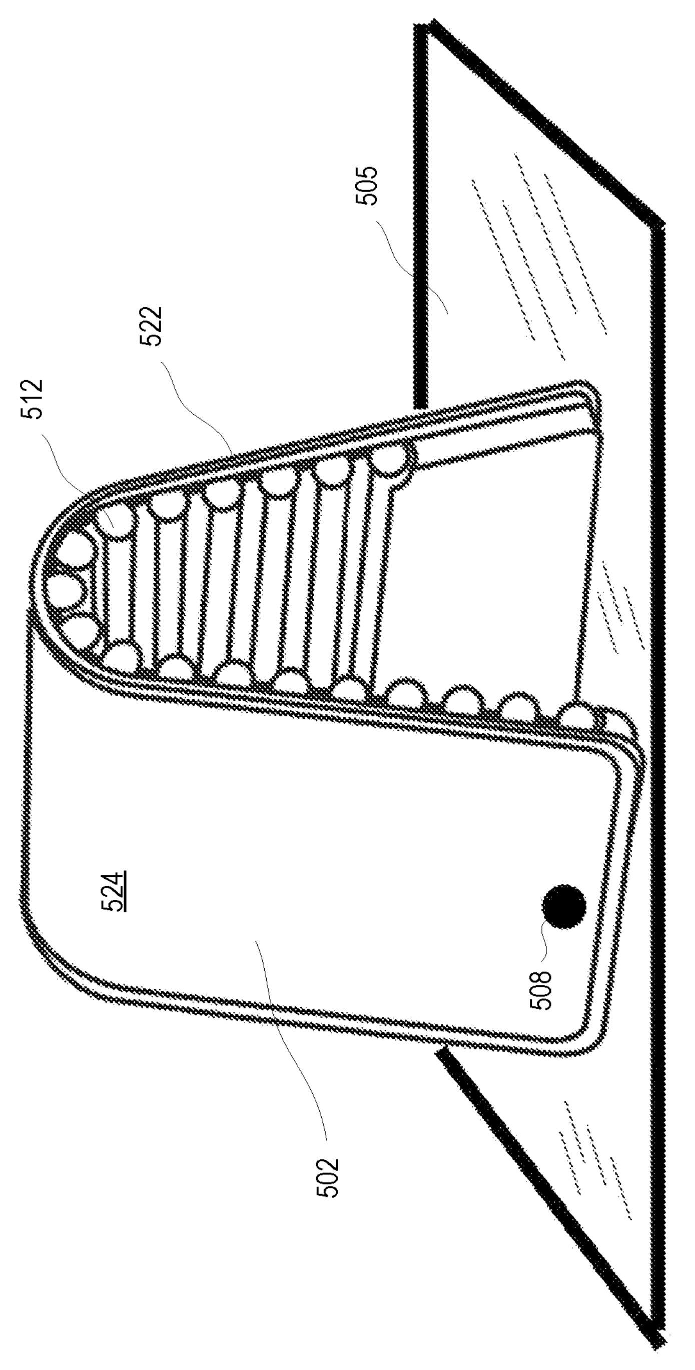
FIG. 5 illustrates a flexible electronic device in a tent configuration, according to one or more embodiments.

FIG. 5 illustrates a flexible electronic device 500 in a tent configuration, according to one or more embodiments. Electronic device 500 can be an implementation of electronic device 400, having similar components and/or functionality, including one or more linkage members, shown generally at 512 that allows the electronic device 500 to be deformable, whereby the electronic device 500 can be bent into a configuration and remains in that configuration until a user changes the configuration by additional bending/unbending. As shown in FIG. 5, the tent configuration enables the display 502 of flexible electronic device 500 to include a first logical display region 524 and a second logical display region 522, which is substantially opposed to first logical display region 524. In usage, the flexible electronic device 500 may be placed on a substantially flat surface 505 such as a desk, table, counter, or the like. The flexible electronic device 500 may be deformed and placed on the flat surface 505 such that ends (e.g., similar to 211 and 213 shown in FIG. 2A) contact the surface 505, and the resulting device configuration resembling the shape of a "tent." In the tent configuration, one viewer can be viewing logical display region 524, while another viewer is simultaneously viewing logical display region 522. In one or more embodiments, one logical display region can render informational content, such as a clock, calendar, video, conference call, and the like, while another logical display region renders non-informational content, such as decorative content including designs and/or images that are selected/generated based on an environment surrounding the electronic device 500. In one or more embodiments, each of logical display region 522 and logical display region 524 can present different non-informational content or different informational content, both right side up on respective sides of the tent.

Figure 6:
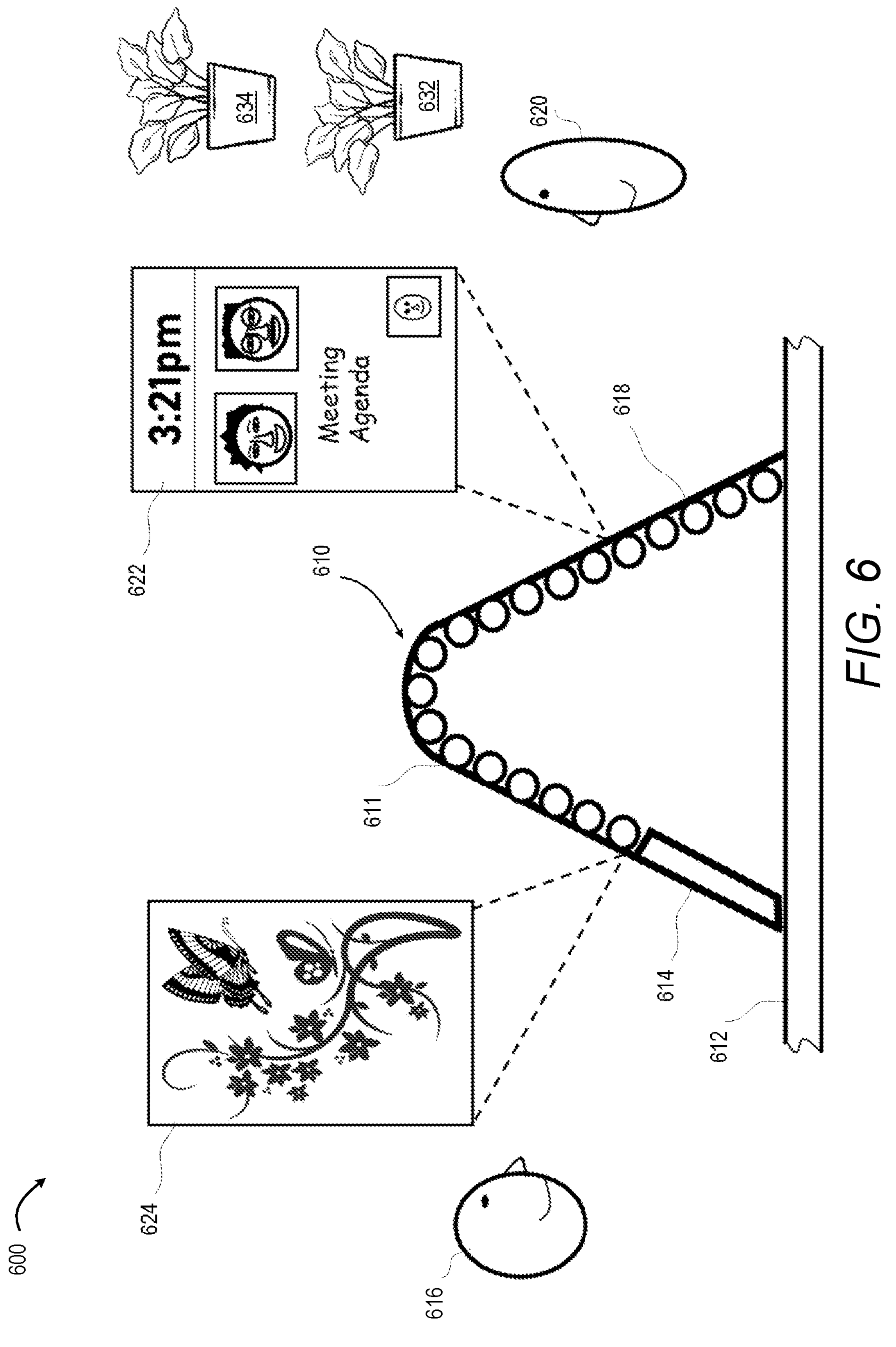
FIG. 6 illustrates an example usage of a flexible electronic device in a tent configuration, according to one or more embodiments.

FIG. 6 illustrates an example 600 of usage of a flexible electronic device 610 in a tent configuration, according to one or more embodiments. Electronic device 610 can be an implementation of electronic device 500, having similar components and/or functionality. As shown in FIG. 6, flexible electronic device 610 is placed in a tent configuration on a flat surface 612 such as a table, desk, counter, or the like. In the tent configuration, the display 611 includes first logical display region 614 and second logical display region 618. In one or more embodiments, the logical display region 614 faces in a different direction than respect to logical display region 618. Users in different positions have different views of the logical display regions. A user 620 is oriented to have a direct line of sight view to second logical display region 618, while a different user 616 is oriented to have a line-of-sight view to first logical display region 614. The flexible electronic device 610 can render informational content, which is shown at 622, on logical display region 618. The informational content 622 can include a time of day, a video conference call rendering, and/or other informational content.

Similarly, flexible electronic device 610 can render non-informational content, which is shown at 624, on first logical display region 614. and the non-informational content can include a design, photograph, video clip, animation, and/or other non-informational content. In one or more embodiments, an integrated camera (e.g., 508 as shown in FIG. 5), may acquire preview images of one or more items, such as items 632 and 634. As shown in FIG. 6, items 632 and 634 are potted plants. In one or more embodiments, an artificial intelligence (machine learning) process may be executed on flexible electronic device 610 (e.g., dedicated artificial intelligence (AI) engines 105 of FIG. 1) to detect a category and/or classification for items 632 and 634, and to utilized that information to generate the design image shown at 624. That is, based on the detection of items 632 and 634 as potted plants, the flexible electronic device 610 generates a botanical-themed design 624 for display as the non-informational content. Accordingly, user 620 is using the electronic device 610 for a functional purpose of participating in a video conference call, while simultaneously, another user 616 is observing device 610 as a decorative item by viewing the design shown at 624, which is automatically coordinated with the environment surrounding the flexible electronic device 610, where the environment includes one or more items, depicted as 632 and 634.

Figure 7A:
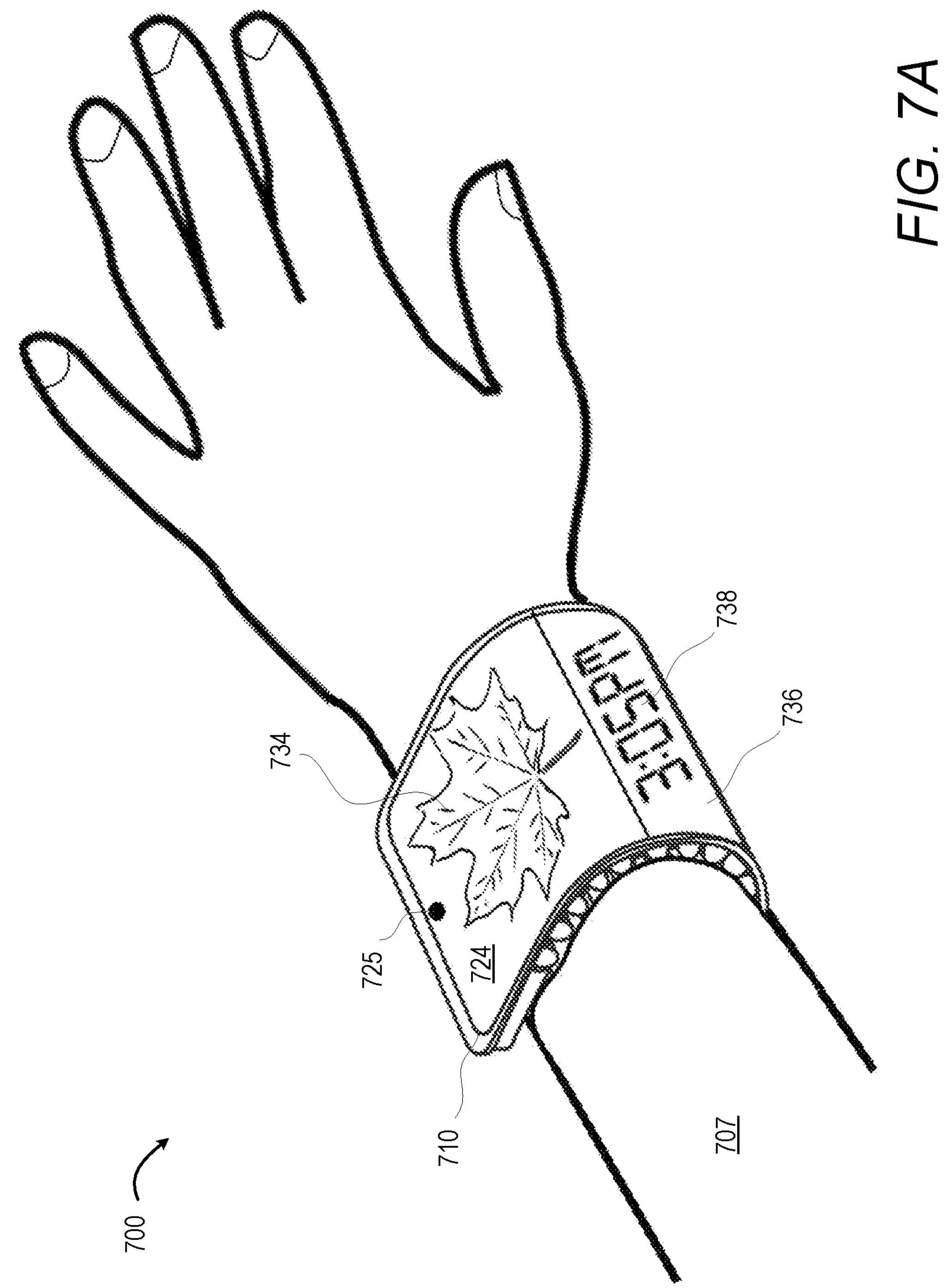
FIG. 7A illustrates a flexible electronic device in a wearable configuration, according to one or more embodiments.

FIG. 7A illustrates a flexible electronic device 700 in a wearable configuration, according to one or more embodiments. Electronic device 700 can be an implementation of electronic device 500, having similar components and/or functionality. As shown in FIG. 7A, flexible electronic device 700 is bent in a "C-shape" or circular configuration to enable device 700 to be worn on an arm 707 of a user. In the C-shape or circular configuration, the display 710 includes a first logical display region 724, and a second logical display region 736. In one or more embodiments, first logical display region 724 can include an outward facing portion of the display. As shown in FIG. 7A, second logical display region 736, which faces the user, includes informational content 738, which can include, but is not limited to, time of day, weather information, signal strength information, indications of received messages, and so on, while second logical display region 724, which faces away from the user and/or is visible by an outside viewer, includes non-informational content, including leaf design 734. In one or more embodiments, onboard camera 725 is used to acquire an image of apparel being worn by the user, by capturing a self-photo ('selfie') or scanning the camera's field of view. The detected apparel style, colors, and/or pattern can be used as criteria for selecting and/or generating non-informational content for display in first logical display region 724. In one or more embodiments, second logical display region 736 is easily visible to the user wearing the electronic device 700 while first logical display region 724 is easily visible to other users that are in proximity to the user wearing the electronic device 700. Accordingly, in one or more embodiments, the device 700 can serve as both a fashion accessory, by presenting the design 734 on first logical display region 724, and as a functional electronic device, by displaying informational content 738 such as time of day on second logical display region 736.

One or more embodiments can include: identifying, by a processor of an electronic device having a flexible electronic display and usable as a wearable device, a context associated with a user of the electronic device, while the electronic device is being worn by the user; and based on the context, loading and presenting a customization display theme on at least an outward facing portion of a flexible display of the electronic device. One or more embodiments can include: in response to receiving an indication of an on-body or near-body position of the electronic device: triggering at least one image capturing device of the electronic device to activate and capture corresponding preview image(s) of a respective field of view; receiving the preview image(s); determining an on-body position of the electronic device, in part based on the preview images; partitioning the electronic display into a first display region facing away from the user and at least one second display region; determining the user context from information within the received preview image(s); and loading the customization display theme with one or more theme elements rendered on at least the first display region, independent of and separate from the second display region. One or more embodiments can include: outputting informational content associated with the user context in the first display region; and outputting non-informational content in the second display region. One or more embodiments can include: identifying apparel being worn by the user; and presenting the customization display theme by rendering an image corresponding to the identified apparel in the first display region on the electronic display. One or more embodiments can include initiating a generative artificial intelligence (AI) process that creates the image that is rendered. One or more embodiments can include determining the user context based, in part, on biometric information received by the processor via one or more sensors. One or more embodiments can include receiving audio content from an audio capturing device of the electronic device and identifying the user context based on the received audio content.

Figure 7B:
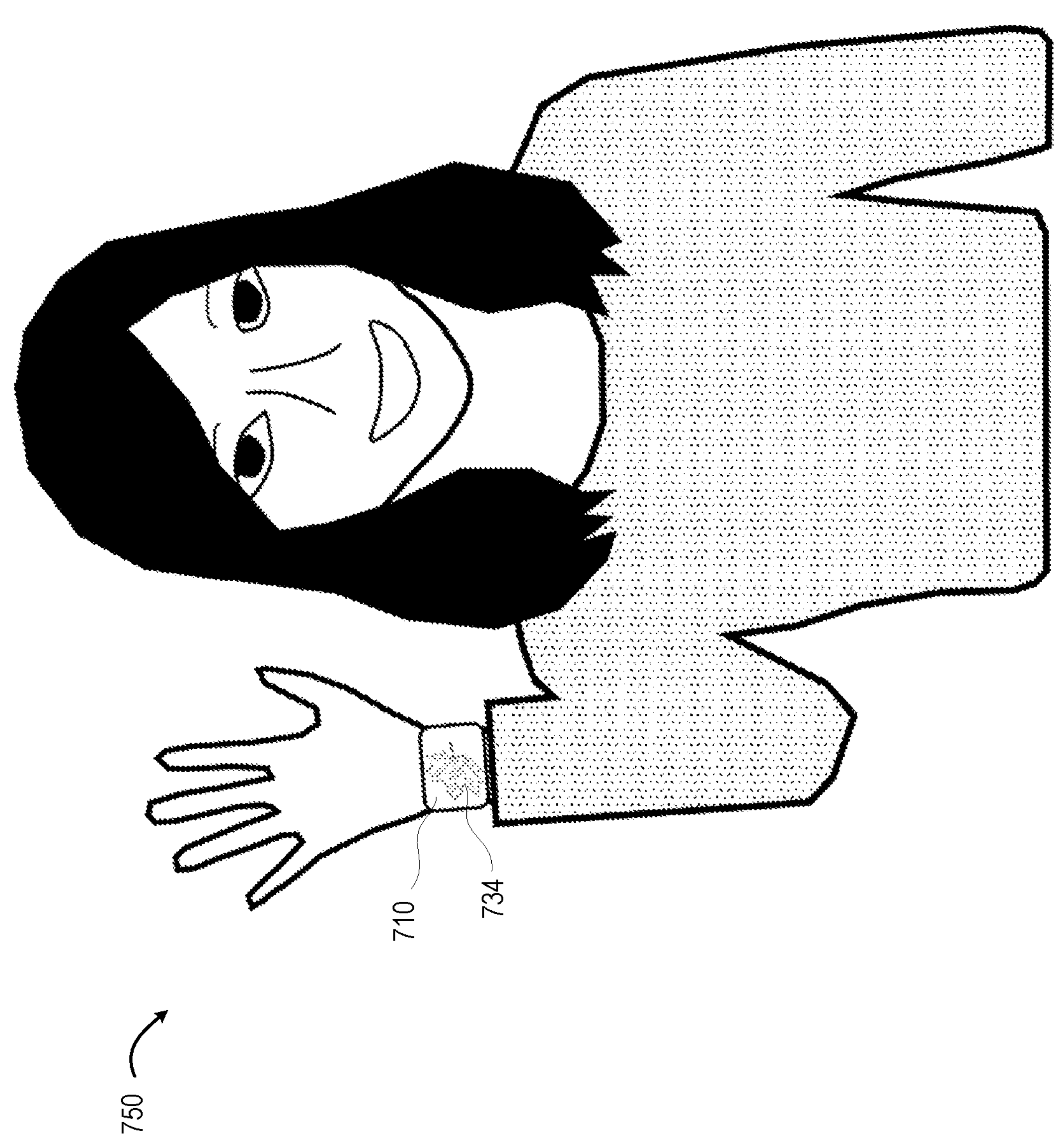
FIG. 7B illustrates the flexible electronic device of FIG. 7A as viewed by an onlooker.

FIG. 7B illustrates the flexible electronic device of FIG. 7A as viewed by an onlooker. As can be seen in FIG. 7B, the wearer 750 is giving a waving gesture to an onlooker. From this viewpoint, the display 710 showing design 734 is visible to the onlooker, whereas the informational content 738 of FIG. 7A, is not visible to the onlooker. Accordingly, one or more embodiments can include a wearable electronic device that includes a flexible display partitioned into multiple logical regions, where at least one logical region presents informational content to the wearer, while at least one other logical region presents non-informational content to an onlooker.

Figure 8:
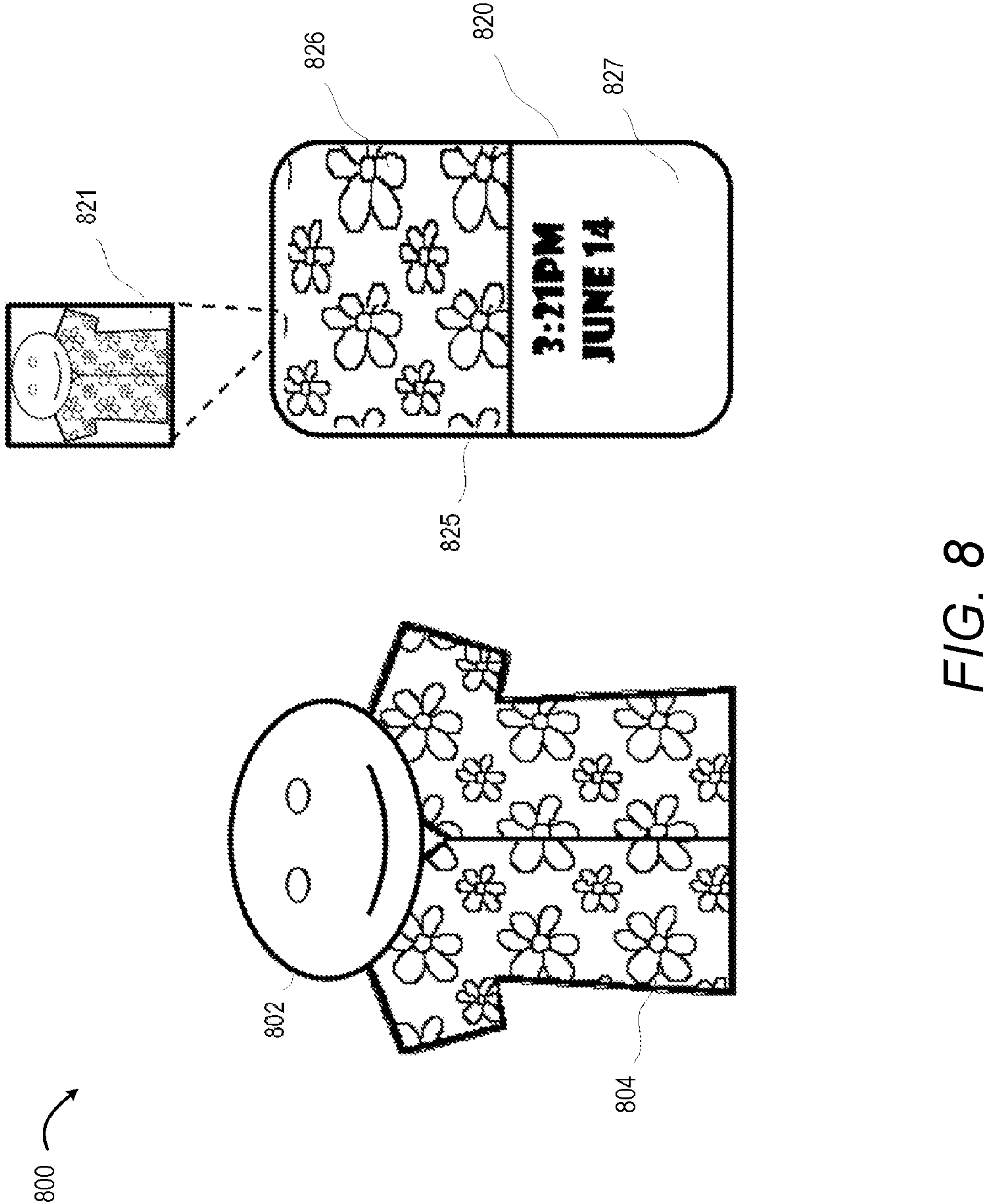
FIG. 8 is a diagram illustrating another example of device customization based on identified user worn apparel, according to one or more embodiments.

FIG. 8 is a diagram 800 illustrating another example of device customization based on identified apparel, according to one or more embodiments. A user 802 is wearing apparel that includes a shirt 804. The shirt 804 includes a floral pattern of various shades and/or colors. The user 802 takes a preview image 821 with his electronic device 820. Device 820 may be an implementation of communication device 100 (FIG. 1) having the same or similar components and providing the same or similar functions as communication device 100. The image content of the self-photo is analyzed to determine the attire. The analysis can be performed on the device 820. Alternatively, the image content can be transmitted to a remote server for analysis (e.g., 175 of FIG. 1), and results of the analysis including the determined theme and possible corresponding theme-styled images can be provided to the electronic device 820. The results can include identification of colors and/or patterns. The results can include an image that the electronic device 820 can use as a background image. The analysis can include machine learning. The analysis can be based on one or more image classifiers.

In the example of FIG. 8, the attire analysis includes identification of apparel that includes shirt 804, which causes a controller (processor) within electronic device 820 to render a floral pattern including multiple flowers, indicated generally at 826, in logical display region 825, where the flower pattern, and/or color matches or resembles the pattern of the shirt 804. The floral pattern serves as non-informational content that gives an appearance that the device 820 'goes with' the shirt 804, thereby enabling the user 802 to use his electronic device 820 as a fashion accessory for casual purposes/functions. Additionally, in logical display region 827, informational content, such as a time and date, can be displayed, providing an electronic device that is both decorative and functional.

Figure 9:
FIG. 9 depicts a flowchart of a method for loading a customization display theme based on an identified user context, according to one or more embodiments.
Figure 9:
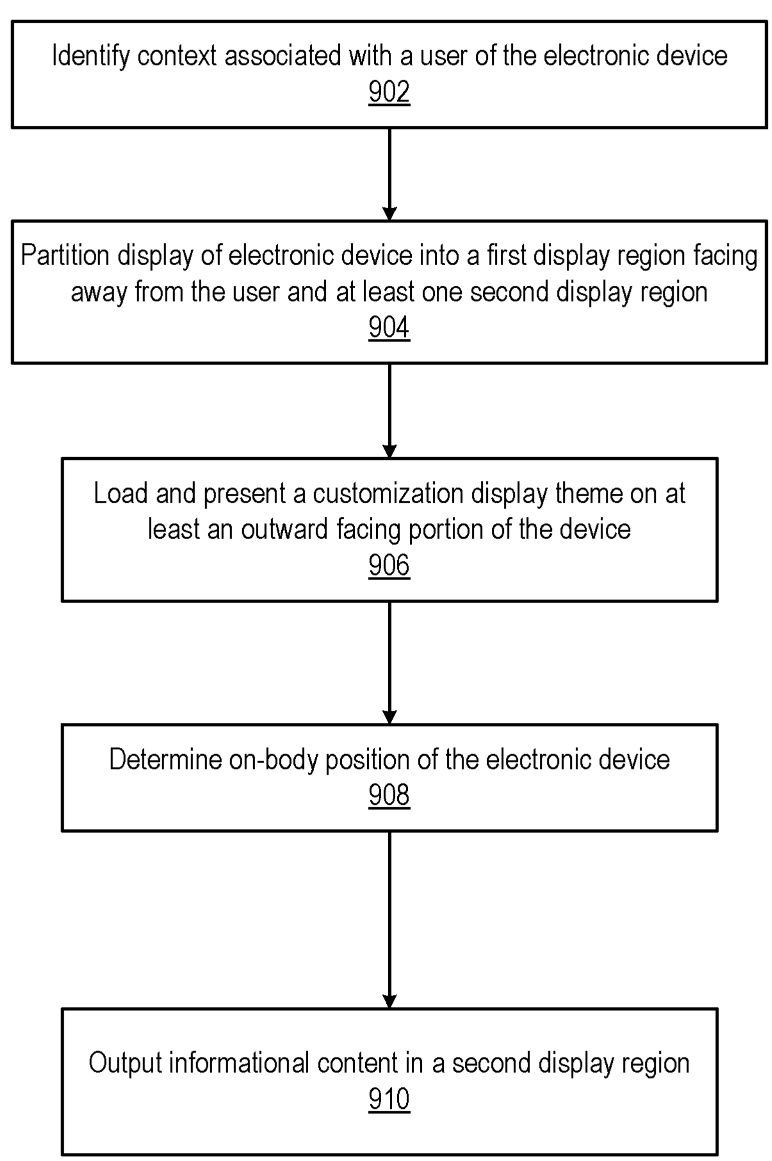
Figure 10:
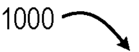
FIG. 10 depicts a flowchart of a method for identifying a user context, according to one or more embodiments.
Figure 10:
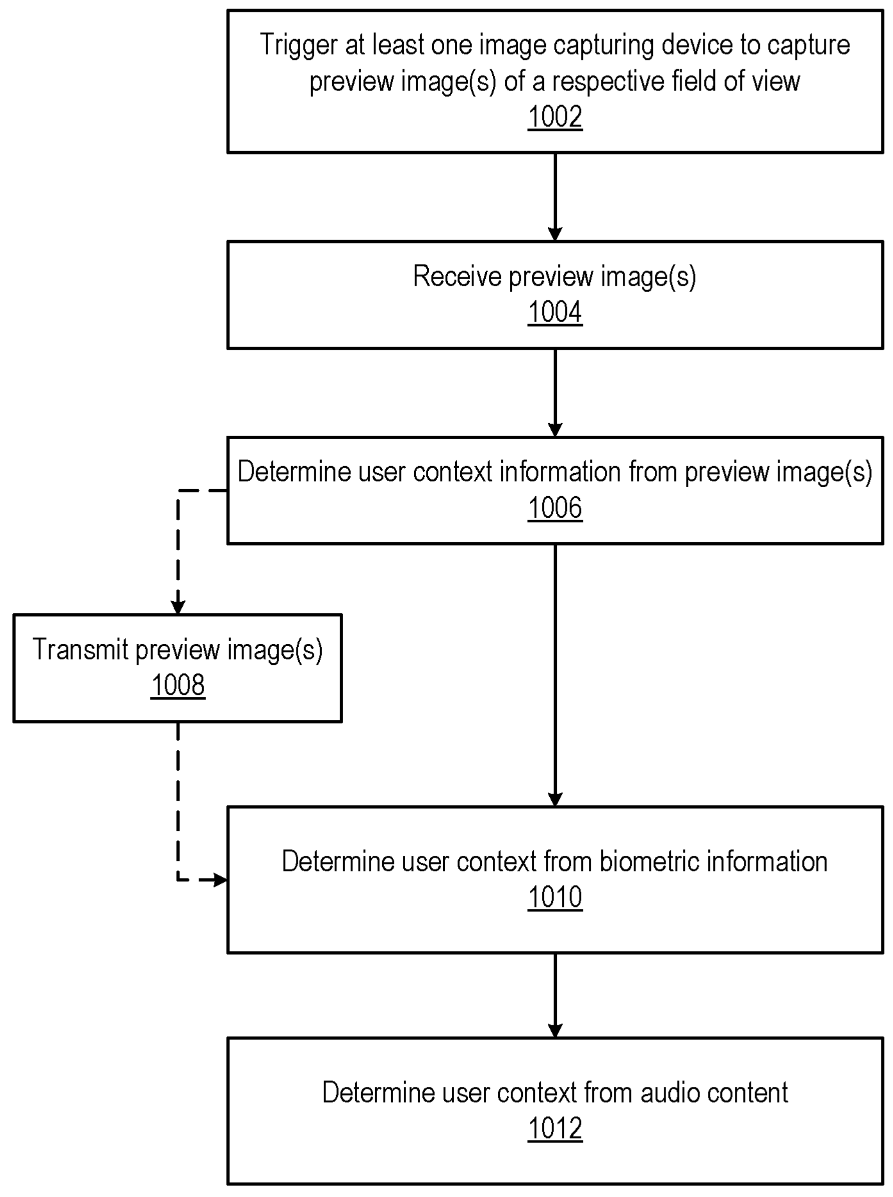

Referring now to the flowcharts presented by FIGS. 9-10, the descriptions of the methods in FIGS. 9-10 are provided with general reference to the specific components and features illustrated within the preceding FIGS. 1-8. Specific components referenced in the methods of FIGS. 9-10 may be identical or similar to components of the same name used in describing preceding FIGS. 1-8. In one or more embodiments, processor 102 (FIG. 1) configures electronic device 100 (FIG. 1) to provide the described functionality of the methods of FIGS. 9-10 by executing program code for one or more modules or applications provided within system memory 120 of electronic device 100.

FIG. 9 depicts a flowchart of a method 900 for loading a customization display theme based on an identified user context, according to one or more embodiments. The method 900 starts with identifying a context associated with a user of the electronic device at block 902. Identifying a context can include identifying apparel being worn by a user (e.g., via a self-photo), identifying a location of a user, and so on. In one or more embodiments, an image such as a self-photo may be analyzed to determine attire being worn by a user. The analysis can be performed on the electronic device (e.g., 700 of FIG. 7A). Alternatively, the image content can be transmitted to a remote server for analysis (e.g., 175 of FIG. 1), and results of the analysis can be provided to the electronic device.

The method 900 continues with partitioning the display of an electronic device into a first region facing away from the user, and at least one second display region, at block 904. In one or more embodiments, the partitioning is based on the configuration of the electronic device (e.g., the shape into which it is bent/deformed) The first display region can present non-informational content, such as an image that includes a design, pattern, illustration, photograph, or the like. The at least one second display region can present informational content, such as a time of day, and/or other informational content. Examples of such partitioning can be seen in at least FIG. 2A-2C.

The method 900 continues with loading and presenting a customization display theme on at least an outward facing portion of the device at block 906. An example of loading and presenting a customization display theme on at least an outward facing portion of the device is shown in logical display region 724 of FIG. 7A, where a design 734 that includes a leaf is shown. In one or more embodiments, the design 734 can include, or be part of, a customization display theme. The method 900 continues with determining an on-body position of the electronic device at block 908. In one or more embodiments, the determining an on-body position of the electronic device can be accomplished using input from an on-body sensor (e.g., 149 of FIG. 1), as well as motion sensor(s) (e.g., 162 of FIG. 1), accelerometer(s) (e.g., 163 of FIG. 1), gyroscopes (e.g., 164 of FIG. 1), and/or other sensors. The method 900 continues with outputting informational content in a second display region at block 910. An example of outputting informational content in a second display region is shown in at least FIG. 7A, in which logical display region (region) 736 includes informational content 738.

FIG. 10 depicts a flowchart of a method 1000 for identifying a user context, according to one or more embodiments. The method 1000 starts with triggering at least one image capturing device to capture preview image(s) of a respective field of view at block 1002. The preview images can include an image of a user, such as acquired by a self-photo ('selfie'). The method 1000 continues with the processor of the electronic device receiving the preview image(s), at block 1004. In one or more embodiments, the images can include images saved in a JPEG (Joint Photographic Experts Group) format. In one or more embodiments, the images can include images saved in a HEIC (High Efficiency Image File Format). In one or more embodiments, the images can include images saved in a RAW format, such as DNG (Digital Negative). Other image formats may be used in one or more embodiments.

The method 1000 continues with determining user context information from preview image(s) at block 1006. The method 1000 can optionally include transmitting preview images to a second electronic device at block 1008. The second electronic device can include an electronic device such as server 175 shown in FIG. 1. The method 1000 can optionally include determining a user context from biometric information at block 1010. The biometric information can be obtained from the electronic device. The biometric information can include, but is not limited to, heart rate, step rate (number of steps taken per minute), breathing rate, body temperature, and/or other biometric information. A customization display theme can be loaded based on the biometric information. As an example, when a user has an elevated heart rate, a background image associated with exercise and/or fitness can be displayed on a logical display region of the electronic device. Similarly, when the user has a resting heart rate, a different background image associated with calmness and serenity can be displayed on a logical display region of the electronic device. The method 1000 can optionally include determining a user context from audio content at block 1012. As an example, when a user is in a noisy environment such as a nightclub, where loud music is playing, one or more of the disclosed embodiments may identify one or more parameters pertaining to the music, including, but not limited to, artist, title, tempo, genre, and so on. Based on the parameters, a particular customization display theme may be loaded/rendered on a logical display region of the electronic device. As an example, the background image can include an image of an artist that created the song, and/or other images associated with the tempo, genre, and/or other musical parameters that are detected. One or more of the steps shown in method 1000 (and also in method 900) may be performed in a different order, performed concurrently, or omitted, in one or more embodiments.

According to one or more embodiments, the customization display theme can include images. The images can be photographs, illustrations, animated GIFs, and so on. The images can be included as wallpapers for a background image for a home screen and/or lock screen of an electronic device. The customization display theme can include font information. The font information can include a font type, font color, font size, and/or font style. The customization display theme can include a user interface theme. For example, a customization display theme can include style and/or placement of user interface elements such as drop-down menus, radio buttons, checkboxes, and the like. Other customization display theme elements are possible in disclosed embodiments.

As can now be appreciated, the disclosed embodiments provide a flexible, deformable, electronic device that can be bent into one or more configurations that enable logical display regions that face in different directions, and presenting different types of content, such as non-informational content in one or more logical display regions while simultaneously providing informational content in at least one other logical display region. Thereby, the disclosed embodiments enable providing a fashion accessory that can dynamically change based on user context, while also providing functionality via informational content that is presented to a wearer of the electronic device.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

an electronic display that is flexible and is mounted in a flexible enclosure that enables the electronic display to be bent into a configuration for use as a wearable device; and at least one image capturing device which captures images within a field of view and produces image content;

at least one sensor for detecting an on-body or near-body position of the electronic device;

a processor communicatively coupled to the electronic display, to the at least one sensor, and to the at least one image capturing device, and which is configured to cause the electronic device to:

receive an indication from the at least one sensor of an on-body or near-body position of the electronic device;

trigger the at least one image capturing device to activate and capture corresponding one or more preview images of a respective field of view in response to receiving the indication of an on-body or near-body position of the electronic device;

determine an on-body position of the electronic device, in part based on the one or more preview images;

identify a context associated with a user of the electronic device based on the determined on-body position, while the electronic device is being worn by the user; and based on the context, load and present a customization display theme on at least an outward facing portion of the electronic display.

2. The electronic device of claim 1, wherein the processor is further configured to cause the electronic device to:

partition the electronic display into a first display region facing away from the user and at least one second display region;

determine the user context from information within the received one or more preview images; and load the customization display theme with one or more theme elements rendered on at least the first display region.

3. The electronic device of claim 2, wherein further the processor enables the electronic device to:

output non-informational content associated with the user context in the first display region; and output informational content in the second display region.

4. The electronic device of claim 2, wherein:

to determine the user context, the processor identifies apparel being worn by the user; and to present the customization display theme, the processor renders an image corresponding to the identified apparel in the first display region on the electronic display.

5. The electronic device of claim 4, wherein the processor:

identifies one or more of a color and a pattern within the apparel worn by the user; and renders, via a generative artificial intelligence (AI) process, a background image in at least one of the first display region and the second display region that includes at least one of a similar color to a color of the identified apparel and a similar pattern to a pattern of the identified apparel.

6. The electronic device of claim 2, further comprising:

a communication interface that enables the electronic device to connect to and transmit instructions to a second electronic device; and wherein to determine a user context from information within the received one or more preview images, the processor transmits the received one or more preview image(s) to the second electronic device to cause the second electronic device to provide the customization display theme to the electronic device.

7. The electronic device of claim 1, wherein the processor:

receives, via one or more sensors, biometric information of the user; and determines the user context based, in part, on the biometric information.

8. The electronic device of claim 1, further comprising an audio capturing device communicatively coupled to the processor, and wherein determining the user context is further based on received audio content from the audio capturing device.

9. A method comprising:

receiving an indication from at least one sensor of an on body or near-body position of an electronic device that is a flexible electronic device;

in response to receiving the indication from the at least one sensor of an on-body or near-body position of the electronic device, triggering at least one image capturing device of the flexible electronic device to activate and capture corresponding one or more preview images of a respective field of view, the electronic device having a flexible electronic display and being usable as a wearable device;

determining, by a processor of the electronic device, an on-body position of the electronic device, in part based on the one or more preview images;

identifying, by the processor, a context associated with a user of the electronic device based on the determined on-body position, while the electronic device is being worn by the user; and based on the context, loading and presenting a customization display theme on at least an outward facing portion of a flexible display of the electronic device.

10. The method of claim 9, wherein the electronic device comprises at least one sensor for detecting an on-body or near-body position of the electronic device, the method further comprising:

partitioning the electronic display into a first display region facing away from the user and at least one second display region;

determining the user context from information within the received one or more preview images; and loading the customization display theme with one or more theme elements rendered on at least the first display region.

11. The method of claim 10, further comprising:

outputting non-informational content associated with the user context in the first display region; and outputting informational content in the second display region.

12. The method of claim 10, further comprising:

identifying apparel being worn by the user; and presenting the customization display theme by rendering an image corresponding to the identified apparel in the first display region on the electronic display.

13. The method of claim 12, further comprising:

identifying one or more of a color and a pattern within the apparel worn by the user; and rendering a background image in at least one of the first display region and the second display region that includes at least one of a similar color to a color of the identified apparel and a similar pattern to a pattern of the identified apparel.

14. The method of claim 12, further comprising initiating a generative artificial intelligence (AI) process that creates the image that is rendered.

15. The method of claim 10, further comprising: transmitting the received preview images to a second electronic device to cause the second electronic device to provide the customization display theme to the electronic device; and receiving the customization display theme from the second electronic device.

16. The method of claim 9, further comprising determining the user context based, in part, on biometric information received by the processor via one or more sensors.

17. The method of claim 9, wherein determining the user context comprises: receiving audio content from an audio capturing device of the electronic device; and identifying the user context based on the received audio content.

18. A computer program product comprising a non-transitory computer readable medium having program instructions that when executed by a processor of an electronic device that comprises a flexible electronic display that is usable as a wearable device, the program instructions configure the electronic device to perform functions comprising:

receiving an indication from at least one sensor of an on-body or near-body position of the electronic device; and in response to receiving an indication of an on-body or near-body position of the electronic device, triggering at least one image capturing device of the electronic device to activate and capture corresponding one or more preview images of a respective field of view;

determining, by a processor of the electronic device, an on-body position of the electronic device, in part based on the one or more preview images;

identifying a context associated with a user of the electronic device based on the determined on-body position, while the electronic device is being worn by the user; and based on the context, loading and presenting a customization display theme on at least an outward facing portion of the display.

19. The computer program product of claim 18, wherein the electronic device includes at least one image capturing device and at least one sensor for detecting an on-body or near-body position of the electronic device, and wherein the computer program product further comprises program instructions for:

partitioning the electronic display into a first display region facing away from the user and at least one second display region;

determining the user context from information within the received one or more preview images; and loading the customization display theme with one or more theme elements rendered on at least the first display region.

* * * * *